US00RE33908E

United States Patent [19]

Tappe et al.

[11] E Patent Number: Re. 33,908

[45] Reissued Date of Patent: May 5, 1992

[54] MIXTURES OF BLUE MONO-AZO DISPERSE DYESTUFFS AND THEIR USE FOR DYEING POLYESTER

[75] Inventors: Horst Tappe, Dietzenbach; Hubert Kruse, Kelkheim; Reinhard Kühn, Frankfurt; Albert Bode, Schwalbach; Margareta Boos, Hattersheim, all of Fed. Rep. of Germany

[73] Assignee: Cassella Aktiengesellschaft, Frankfurt am Main, Fed. Rep. of Germany

[21] Appl. No.: 658,720

[22] Filed: Feb. 19, 1991

Related U.S. Patent Documents

Reissue of:

[64] Patent No.: 4,678,476
Issued: Jul. 7, 1987
Appl. No.: 911,746
Filed: Sep. 26, 1986

[30] Foreign Application Priority Data

Nov. 9, 1985 [DE] Fed. Rep. of Germany ..... 3539771

[51] Int. Cl.[5] ..... C09B 29/08; C09B 67/22; D06P 1/04

[52] U.S. Cl. ..... 8/639; 8/524; 8/528; 8/532; 8/533; 8/638; 8/696; 8/921; 8/922; 8/924

[58] Field of Search ..... 8/639

[56] References Cited

U.S. PATENT DOCUMENTS

| | | | |
|---|---|---|---|
| 3,632,569 | 1/1972 | Artz et al. | 8/693 |
| 3,671,177 | 6/1972 | Artz et al. | 8/696 |
| 3,923,455 | 12/1975 | Cornelius et al. | 8/696 |
| 4,257,943 | 3/1981 | Hahnle | 564/223 |
| 4,678,476 | 7/1987 | Tappe et al. | 8/639 |

FOREIGN PATENT DOCUMENTS

| | | |
|---|---|---|
| 50587 | 4/1982 | European Pat. Off. . |
| 66235 | 12/1982 | European Pat. Off. . |
| 73414 | 3/1983 | European Pat. Off. . |
| 57-042767 | 3/1982 | Japan . |
| 57-042982 | 3/1982 | Japan . |
| 2002803 | 2/1979 | United Kingdom . |
| 2027733 | 2/1980 | United Kingdom . |
| 1582743 | 1/1981 | United Kingdom . |

OTHER PUBLICATIONS

Chemical Abstracts, vol. 97, No. 8, of 97:57110t, p. 65, Aug. 1982, "Monoazo Dyes".

Chemical Abstracts, vol. 97, No. 6, 97:40307q, p. 76, Aug. 1982 "Disperse Monoazo Dyes".

*Primary Examiner*—A. Lionel Clingman

*Attorney, Agent, or Firm*—Connolly and Hutz

[57] ABSTRACT

Synthetic fiber materials are effectively colored by dyeing or printing with a dyestuff mixture containing at least two separate dyestuffs (I) and (II) in a weight ratio of (I):(II) of from (20 to 99):(80 to 1) wherein:

(I) is at least one dyestuff of the formula

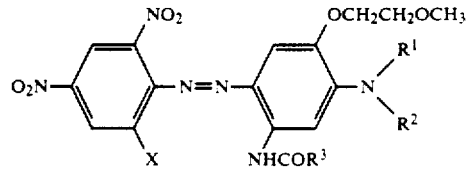

and (II) is at least one dyestuff of the formula

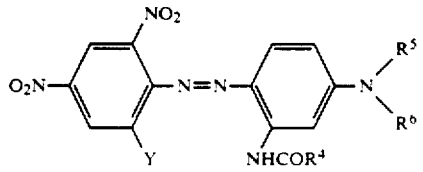

in which

X and Y are the same or different and each is independently chloro and bromo:

$R^1$ and $R^2$ are the same or different and each independently denotes hydrogen, alkoxy having 1 to 4 carbon atoms, alkenyl having 3 or 4 carbon atoms, cyclohexyl, benzyl, chlorobenzyl, bromobenzyl, nitrobenzyl, cyanobenzyl, alkylbenzyl having 1 to 4 carbon atoms in the alkyl moiety, alkoxybenzyl having 1 to 4 alkoxy carbon atoms, alkyl having 1 to 11 carbon atoms, alkyl having 1 to 11 carbon atoms interrupted by 1 to 3 oxygen atoms or substituted alkyl having 1 to 11 carbon atoms wherein the substituent is one selected from the group consisting of chloro, bromo, cyano, phenyl, phenoxy, hydroxy, ($C_1$-to-$C_4$-alkyl)-carbonyloxy, ($C_1$-to-$C_4$-alkoxy)-carbonyl, phenylcarbonyloxy, ($C_3$-to-$C_5$-alkenyloxy)-carbonyloxy, ($C_1$-to-$C_4$-alkoxy)-carbonyloxy, phenoxycarbonyloxy, tetrahydrofurfuryl, ($C_1$-to-$C_4$-alkyl)-tetrahydrofurfuryl, tetrahydropyronyl and ($C_1$-to-$C_4$-alkyl)-tetrahydropyronyl;

$R^3$ and $R^4$ are the same or different and each is independently methyl, ethyl, n-propyl or i-propyl;

$R^5$ and $R^6$ are the same or different and each is independently one of the definitions of $R^1$ and $R^2$ excepting hydrogen.

10 Claims, No Drawings

MIXTURES OF BLUE MONO-AZO DISPERSE DYESTUFFS AND THEIR USE FOR DYEING POLYESTER

Matter enclosed in heavy brackets [ ] appears in the original patent but forms no part of this reissue specification; matter printed in italics indicates the additions made by reissue.

The invention relates to a dyestuff mixture containing or consisting of

I: at least one dyestuff of the formula I

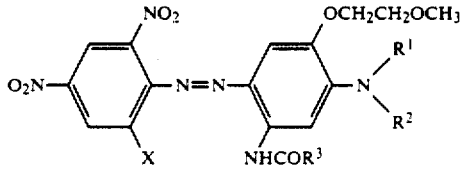

(I)

and

II: at least one dyestuff of the formula II

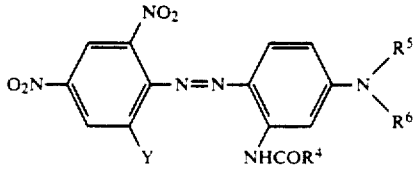

(II)

in which

X and Y are identical or different and denote chlorine or bromine, $R^1$ denotes hydrogen or one of the radicals listed under $R^5$, $R^2$ denotes hydrogen or one of the radicals listed under $R^5$, $R^3$ and $R^4$ are identical or different and denote methyl, ethyl, n- or i-propyl, $R^5$ and $R^6$ are identical or different and denote $C_1$-to-$C_{11}$-alkyl which can be substituted by chlorine, bromine, cyano, phenyl, phenoxy, hydroxyl, ($C_1$-to-$C_4$-alkyl)-carbonyloxy, ($C_1$-to-$C_4$-alkoxy)-carbonyl, phenylcarbonyloxy, ($C_3$-to-$C_5$-alkenyloxy)-carbonyloxy, ($C_1$-to-$C_4$-alkoxy)-carbonyloxy, phenoxycarbonyloxy, tetrahydrofurfuryl, ($C_1$-to-$C_4$-alkyl)-tetrahydrofurfuryl, tetrahydropyronyl or ($C_1$-to-$C_4$-alkyl)-tetrahydropyronyl and/or be interrupted by 1-3 O-atoms, $C_1$-to-$C_4$-alkoxy, $C_3$ or $C_4$-alkenyl, cyclohexyl, optionally chlorine-, bromine-, nitro-, cyano-, $C_1$-to-$C_4$-alkyl- or alkoxy-substituted benzyl and where the weight ratio between components I:II=(20 to 99): (80 to 1).

Alkyl, alkoxy, alkanoyl, alkenyl or alkenyloxy radicals, even when they appear as substituents on other radicals or in connection with other groups, can be straight-chain or branched. In the case of substitutions, these can be mono- or poly-substitutions. In the case of a poly-substitution, preference is given to disubstitution.

Examples of suitable radicals $R^5$ and $R^6$ which can if desired also stand for $R^1$ and/or $R^2$ are: methyl, ethyl, n-propyl, i-propyl, n-butyl, i-butyl, sec.-butyl, tert.-butyl, n-pentyl, i-pentyl, n-hexyl, i-hexyl, 2,3-dimethylbutyl, n-heptyl, i-heptyl, n-octyl, i-octyl, 3-methylheptyl, 2-n-nonyl, i-nonyl, n-decyl, i-decyl, n-undecyl, i-undecyl, 2-methylbutyl, 2-ethylbutyl, 2- or 3-methylpentyl, 2-ethylhexyl, 2-chloroethyl, 2-bromoethyl, 2-cyanoethyl, 2-phenethyl, 3-chloro-, 3-bromo-, 3-phenylpropyl, 2-hydroxyethyl, 2-phenoxyethyl, 2- or 3-hydroxypropyl, 2- or 3-hydroxybutyl, 2- or 3-phenoxypropyl, 2- or 3-phenoxybutyl, 2,3-dihydroxypropyl or -butyl, 3-chloro-2-hydroxypropyl, 2-acetoxyethyl, 4-acetoxybutyl, 2-propionyloxyethyl, 2-butyryloxyethyl, 4-butyryloxybutyl, 2-methoxycarbonylethyl, 3-methoxycarbonylethyl, 3-propoxycarbonylpropyl, 3-i-propoxycarbonylpropyl, 4-butoxybutyl, 2-phenylcarbonyloxyethyl, 5-phenylcarbonyloxypentyl, 2-phenoxycarbonyloxyethyl, 3-phenoxycarbonyloxypropyl, 2-allyloxycarbonyloxyethyl, 3-methallyloxyycarbonyloxypropyl, 4-propenyloxycarbonyloxybutyl, 2-(1-, 2- or 3-butenyl)-oxycarbonyloxyethyl, 2-methoxycarbonyloxyethyl, 3-i-propoxycarbonyloxypropyl, 4-butoxycarbonyloxybutyl, 2-(2- or 3-tetrahydrofurfuryl)-ethyl, 2-(3-ethyltetrahydrofurfur-2-yl)-ethyl, 2-(tetrahydro-4-pyron-2- or 3-yl)-ethyl, 3-(2-ethyltetrahydro-4-pyron-3-yl)-propyl, 2-methoxyethyl, 3-methoxypropyl, 3-methoxy-2-methylpropyl, 2-ethoxyethyl, 3-i-propoxypropyl, 4-i-butoxy-2-methylpropyl, allyl, methallyl, propenyl, crotyl(=2-butenyl), 1- or 3-butenyl, 2-hydroxy-3-methoxypropyl), 2-hydroxy-3-ethoxypropyl, 2-hydroxy-3-i-propoxypropyl, 2-hydroxy-3-propoxypropyl, 2-hydroxy-3-butoxypropyl, 2-hydroxy-3-phenoxypropyl, 2-acetoxy-3-methoxypropyl, 2-acetoxy-3-ethoxypropyl, 2-acetoxy-3-propoxypropyl, 2-acetoxy-3-butoxypropyl, 2-acetoxy-3-phenoxypropyl, methoxy, ethoxy, n- and i-propoxy, n- and i-butoxy, 2-ethoxyethyl, benzyl, 4-chloro-, 4-bromo-, 4-nitro-, 4-cyano-, 4-methyl- or 4-methoxybenzyl, 2-, 3- or 4-ethoxybenzyl, 2,3-dichlorobenzyl, and also radicals of the formulae:

$-CH_2CH_2OCH_2CH_2OC_2H_5$; $-CH_2CH_2OCH_2CH_2OCH_2CH_2OC_2H_5$; $-CH_2CH_2OCH_2CH_2OCH_3$; $-(CH_2CH_2O)_3-CH_3$; $-(CH_2CH_2O)_3-n-C_3H_7$; $-(CH_2CH_2O)_3-i-C_3H_7$; $-(CH_2CH_2O)_2-nC_4H_9$; $-(CH_2)_3O-(CH_2CH_2O)_2-CH_3$; $-(CH_2CH_2O)_2-C_6H_5$; $-CH_2CH_2O-n-C_4H_9$; $-(CH_2CH_2O)_2-CO-CH_3$.

Preferred radicals in the formulae I and II are: for $R^1$: hydrogen or ethyl, and/or for $R^2$: hydrogen or ethyl and/or for $R^5$ and $R^6$: identical or different $C_1$ to $C_4$ alkyl. Very particularly preferred radicals are: for $R^1$: hydrogen, and/or for $R^2$: hydrogen or ethyl, and/or for $R^3$: ethyl, and/or for $R^4$: methyl, and/or for $R^5$: ethyl and/or for $R^6$: ethyl, and/or for X: chlorine, and/or for Y: bromine.

In the dyestuff mixtures according to the invention, the weight ratio between components I:II=(20 to 99):(80 to 1), preferably (80 to 99):(20 to 1) and very particularly preferably (90 to 99):(10 to 1). The components I and II can consist of one, two, three or more dyestuffs of the formulae I and II. Preferably component II consists of a dyestuff of the formula II and component I of one or two dyestuffs of the formula I. If components I and II contain two or more dyestuffs, their content within the two components can vary within wide limits. If component I preferably contains two dyestuffs of the formula I, one dyestuff is preferably present in an amount of 65 to 98 parts by weight and the other in an amount of 15 to 30 parts by weight, these portions being chosen in such a way that their total is 80 to 99 parts by weight.

The dyestuff mixtures according to the invention contain or consist of the two components I and II. The aforementioned weight ratios merely relate to the dyestuff portion of the dyestuff mixtures according to the invention which consists of the components I and II. The dyestuff mixtures according to the invention can in addition contain dispersants, standardizing agents and/or auxiliaries etc. and, where appropriate, other dyestuffs as well.

The dyestuff mixtures according to the invention can be present in powder or in paste form. The pulverulent dyestuff preparations normally have a dyestuff content of 30 to 50% by weight. The remainder consists of standardizing agents and/or auxiliaries, such as, for example, dispersants, wetting agents, emulsifiers, dedusting agents etc. The pasty dyestuff preparations which are present in aqueous suspension normally have a dyestuff content of 20 to 50% by weight and a standardizing agent and/or auxiliary content of 20 to 30% by weight, the remainder being water. Possible auxiliaries which can be present in the pasty dyestuff preparations, in addition to dispersants, emulsifiers and wetting agents, are desiccation retarders, such as, for example, glycols or glycerol, and preservatives or fungicides.

The dyestuff mixtures according to the invention can be prepared by various processes, for example by mixing previously finished individual dyestuffs I and II or by mixing unfinished individual dyestuffs I and II and finishing thereafter or during the mixing process. The mixing of unfinished individual dyestuffs of components I and II is preferably carried out in the presence of dispersants and, where appropriate, further auxiliaries. This mixing process is expediently effected in connection with the wet comminution at temperatures of 0 to 190° C., to be carried out for finishing disperse dyes, expediently in suitable mills, for example colloid, ball, bead or sand mills or dispersion kneaders, but can also be effected, in particular in the case of previously finished individual dyestuffs, by mixing by hand or by stirring into dispersants or dyeing liquors or by incorporation into print pastes.

In the wet comminution of the dyestuffs, the dyestuffs are suspended together with dispersants in a liquid medium, preferably in water, and the mixture is exposed to the action of shearing forces. In the process of wet comminution, the dyestuff particles originally present are mechanically comminuted to such an extent that an optimal specific surface area is obtained and sedimentation of the dyestuffs is as low as possible. The particle size of the dyestuffs is in general about 0.1 to 10 μm.

The dispersants concomitantly used in the wet comminution can be nonionic or anionic. Nonionic dispersants are for example reaction products of alkylene oxides, such as, for example, ethylene oxide or propylene oxide, with alkylatable compounds, such as, for example, fatty alcohols, fatty acids, phenols, alkylphenols and carboxamides. Nonionic dispersants are for example described in DE-A1-2,757,330 (corresponding to U.S. Pat. No. 4,225,311). Anionic dispersants are for example ligninsulphonates, alkyl- or alkylaryl-sulphonates, alkyl aryl polyglycol ether sulphates or condensation products of naphthalene, formaldehyde and sulphuric acid.

The dyestuff dispersions obtained in the wet comminution should be pourable for most uses and can additionally contain further auxiliaries, for example those which act as oxidising agents, such as, for example, sodium n-nitrobenzenesulphonate, or fungicidal agents, such as, for example, sodium o-phenylphenolate or sodium pentachlorophenolate.

The dyestuff dispersions thus obtained can be very advantageously used for making up print pastes and dyeing liquors. They offer particular advantages for example in the continuous processes where the dyestuff concentration of the dye liquors must be kept constant through continuous dyestuff feed into the running apparatus.

For certain use areas, preference is given to powder formulations. These powders contain the dyestuffs, dispersants and other auxiliaries, such as, for example, wetting, oxidising, preserving and dedusting agents.

A process for preparing pulverulent dyestuff preparations consists in stripping the above-described liquid dyestuff dispersions of their liquid content, for example by vacuum drying, freeze drying, by drying on cylinder dryers, but preferably by spray-drying.

If the dyestuffs are to be used for textile printing, the requisite amounts of the dyestuff formulations are kneaded together with thickening agents, such as, for example, alkali metal alginates or the like, and, where appropriate, further additives, such as fixation accelerants, wetting agents and oxidizing agents, to form print pastes.

The individual dyestuffs of the formulae I and II are known (cf. for example DE-B-2,736,785 (corresponding to U.S. Pat. No. 4,257,943) and DE-B-2,833,854 (corresponding to British Pat. No. 2,027,733)) or can be prepared in a manner known per se by diazotising and coupling 6-bromo-2,4-dinitroaniline or 6-chloro-2,4-dinitroaniline and subsequent coupling onto coupling components of the formula Ia

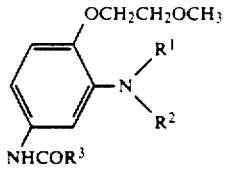

(Ia)

or of the formula IIa

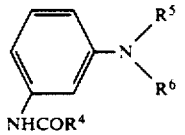

(IIa)

Dyestuff mixtures according to the invention can also be prepared by diazotization and subsequent coupling. In this method, either a mixture of 6-bromo-2,4-dinitroaniline and 6-chloro-2,4-dinitroaniline is diazotized together and subsequently coupled onto a mixture of two different coupling components of the formulae Ia and IIa, or a diazo component (6-bromo-2,4-dinitroaniline or 6-chloro-2,4-dinitroaniline) is diazotized and subsequently coupled onto a mixture of two different coupling components of the formulae Ia and IIa. In this, the diazotization and coupling are effected in a manner known per se, and the mixture of the dyestuffs can be conventionally isolated, dried and converted in the previously mentioned manner into a pulverulent or pasty preparation.

In the dyestuff mixtures according to the invention, the dyestuffs can also be present in the form of mixed crystals. Such mixed crystal formation is effected in particular when the dyestuff mixture, in the course of its synthesis or the subsequent finishing, has been heated to temperatures of 80° to 190° C. Such heating can be carried out in water in the presence of one or more solvents, such as, for example, ethanol or n-butanol, or in the presence of one or more emulsifiers and/or dispersants.

The dyestuff mixtures according to the invention are highly suitable for dyeing and printing hydrophobic synthetic fibre materials. Surprisingly, the dyestuff mixtures according to the invention are superior to the individual dyestuffs in regard to dyeing behaviour and the coloristic fastness properties. The dyestuff mixtures according to the invention are distinguished in particular by temperature independence of dyeing behaviour, good bath exhaustion and good build-up up to high depths of shade, and also by very high tinctorial strength. They are additionally impervious to Ca, Mg, Cu or Fe ions, which can cause precipitation in the case of other dyestuffs. Using the dyestuff mixtures according to the invention, exact blue dyeings are obtained in a brief dyeing time even under unfavourable machine- or substrate-related dyeing conditions. This is particularly important in relation to their use in dyeing wound packages. The dyestuff mixtures and/or mixed crystals according to the invention can be used by themselves (i.e. in the blue region) and also in combination with commercially available other dyestuffs, including of other shades (trichromatic dyeing).

Eligible hydrophobic synthetic materials are for example: secondary cellulose acetate, cellulose triacetate, polyamides and in particular high molecular weight polyesters and their mixtures with natural fibre substances, such as, for example, cotton, regenerated cellulose fibres or wool.

Eligible high molecular weight polyester fibres are in particular those based on polyethylene terephthalate, polybutylene terephthalate, polycyclohexylene terephthalate or polyhydroxypropylene terephthalate, and also modified polyester fibres as obtained, for example, by copolymerization with di- or triethylene glycol, polyethylene glycol, glycerol, isophthalic acid or phosphorus compounds.

In mixtures of hydrophobic fibre substances with wool, regenerated cellulose or cotton, the hydrophobic material, in particular the polyester, can account for 10 to 90% by weight, in particular 30 to 70% by weight.

To prepare the dyeing liquors, the requisite amounts of the dyestuff formulations are diluted with the dyeing medium, preferably with water, to such an extent that the result is a liquor ratio for the dyeing of 5:1 to 50:1. In addition, the liquors generally have added to them further dyeing auxiliaries, such as dispersing, wetting and fixing auxiliaries.

The materials to be dyed or printed can be present, for example, in the form of sheet-, fibre- or thread-like structures and have been processed for example into yarns or woven or knitted textile fabrics. The dyeing of the fibre material mentioned with the dyestuff mixtures according to the invention is effected in a manner known per se, preferably from an aqueous suspension, where appropriate in the presence of carriers, between 80° to about 125° C. by the exhaust method, or in the absence of carriers by the HT method in a dyeing autoclave at about 105° to 140° C., and also by the so-called thermosoling process, where the material is padded with the dyeing liquor and then fixed at about 175° to 230° C. The printing of the materials mentioned can be carried out in such a way that the material printed with print paste containing dyestuff mixtures according to the invention is treated, to fix the dyestuff, with HT steam, high-pressure steam or dry heat, where appropriate in the presence of a carrier, at temperatures between about 110° to 230° C.

The actual dyeing can advantageously be followed by a reductive or a dispersant-aided aftertreatment to remove unfixed dyestuff portions.

When using mixtures of polyester fibres with wool, cotton or regenerated cellulose, the admixed fibre can be dyed before or after the polyester dyeing with suitable dyestuffs in the same or a different shade (marls, woven patterns).

In dyestuff mixtures according to the invention, the individual dyestuffs I and II are expediently put together in such a way that a dyestuff which, for example, exhibits a red colour change in incandescent light is combined with a dyestuff which, for example, shows a green colour change in incandescent light. In this way it is possible to combine different components in the mixture to obtain a controlled match of the shade as it appears in artificial light.

Particularly preferred dyestuffs are those which contain or consist of (I) the dyestuffs of the formula III

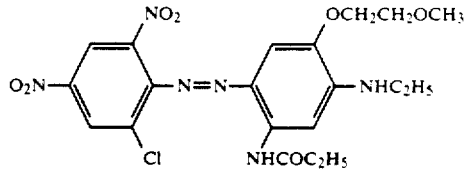

(III)

(II) the dyestuff of the formula IV

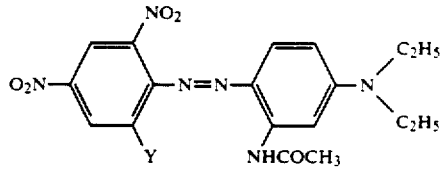

(IV)

in a weight ratio of I:II=(90 to 99):(10 to 1), where Y denotes chlorine or bromine, preferably bromine.

Preference is also given to those dye mixtures according to the invention which contain or consist of (I) the dyestuff of the formula V

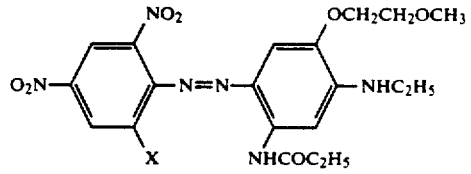

(V)

where X denotes chlorine or bromine, preferably chlorine, (Ia) the dyestuff of the formula VI

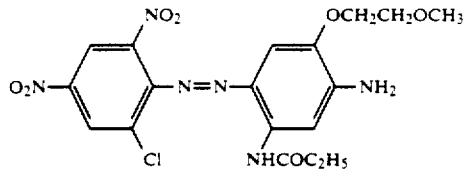

(VI)

(II) the dyestuff of the formula IV

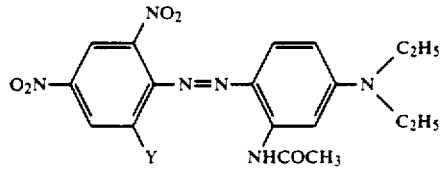

(IV)

where Y denotes chlorine or bromine, preferably bromine, in a weight ratio of I:Ia:II=(65 to 98):(15 to 30):(20 to 1), where the weight ratio of (I+Ia):II=(80 to 99):(20 to 1).

In the examples below, parts and percentages are by weight unless otherwise stated.

EXAMPLE 1

(a) 217.5 parts of 6-chloro-2,4-dinitroaniline are introduced into 2000 parts of concentrated sulphuric acid. While stirring and cooling, 320 parts of nitrosylsulphuric acid (11.5% of $N_2O_3$) are gradually added at 15° to 20° C., which is followed by stirring at 15° C. for at least 3 hours.

(b) 266 parts of 2-ethylamino-4-propionylamino-5-(2-methoxy)-ethoxybenzene are added to a mixture of 2000 parts of water, 300 parts by volume of concentrated hydrochloric acid and 10 parts of amidosulphonic acid. 4000 parts of ice are added, followed at −5° to +3° C. with thorough stirring by the gradual addition of the diazonium salt solution prepared in (a). The reaction is completed by adding sodium acetate up to a pH value of 3. The dyestuff obtained is filtered off with suction, washed with water until neutral and salt-free and dried. This gives 418 parts of the dyestuff of the formula III

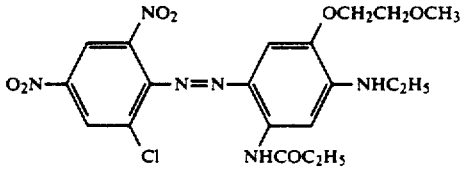

(III)

(c) 262 parts of 6-bromo-2,4-dinitroaniline are introduced into 2000 parts of concentrated sulphuric acid. Otherwise Example 1(a) is repeated, affording a diazonium salt solution of 6-bromo-2,4-dinitroaniline.

(d) 266 parts of N,N-diethyl-N'-acetyl-m-phenylenediamine are combined with the diazonium salt from Example 1(c) to produce by method 1(b) 431 g of the dyestuff of the formula VII

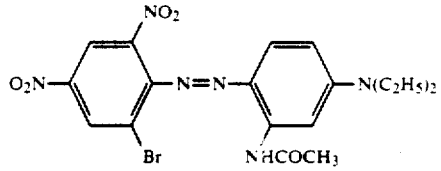

(VII)

(e) 38.5 parts of the dyestuff of the formula III, 2.8 parts of the dyestuff of the formula VII and 58.7 parts of a dispersant from the series of the ligninsulphonates are aqueously bead-milled to give a fine dyestuff dispersion, which is then dried by spray-drying.

The subsequent dyeing is carried out on 100 parts of a PES fibre (polyethylene terephthalate type) which are added in yarn form to a dyeing beaker which contains 2000 parts of water at 60° C., 2 parts of crystalline sodium acetate, 3 parts of 30% strength acetic acid and 5 parts of a commercially available carrier based on diphenyl and 1 part of the dyeing preparation described above. The temperature is raised to 100° C. in the course of 30 minutes and is left there for 60 minutes. This is followed by cooling down, rinsing, drying and a dry heat treatment at 150° C. for 30 seconds.

The result obtained is a strong blue dyeing having a high light fastness and leaving a barely noticeable residual dye content in the remaining dyebath. When HT dyeing at 125° to 135° C., the depth of shade varies only little with the temperature.

EXAMPLE 2

217.5 parts of 6-chloro-2,4-dinitroaniline are diazotized as in 1(a) and are coupled analogously to 1(b) onto a mixture of 59.5 parts of 2-amino-4-propionylamino[-5-](2-methoxy)-ethoxybenzene and 199.5 parts of 2-ethylamino-4-propionylamino-[5-](2-methoxy)-ethoxybenzene. The result obtained is a mixed dye which contains 25 parts of the dyestuff of the formula VI

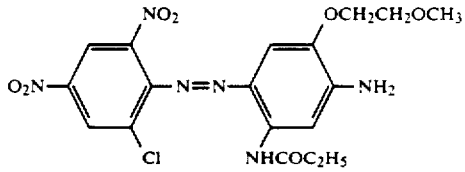

(VI)

and 75 parts of the dyestuff of the formula III.

A fine dyestuff dispersion is prepared as described in Example 1e from 40.2 parts of the mixed dyestuff obtained (this amount containing 10.05 parts of the dyestuff of the formula (VI and 30.15 parts of the dyestuff of the formula III) and 0.8 part of the dyestuff of the formula VII and 59 parts of a commercially available dispersant from the series of the sulphonated naphthaleneformaldehyde condensation products by aqueous bead-milling and is subsequently dried by spray-drying.

EXAMPLE 3

The dyestuff preparations described in Examples 1 and 2 are used to carry out the following experiments:

100 parts of a PES fibre (polyethylene terephthalate type) are introduced as piecegoods into a dyeing autoclave which contains 1000 parts of water at 60° C., 2 parts of crystalline sodium acetate, 3 parts of 30% strength acetic acid and 2 parts of the dyestuff preparation mentioned. The temperature is raised to 130° C. in the course of 30 minutes and is left there for 15 minutes. Cooling down, rinsing with water, aqueous reduction clearing with sodium dithionite/sodium hydroxide solution at 80° C. gives a deep blue dyeing without significant amounts of dyestuff remaining behind in the dyebath.

EXAMPLE 4

Example 1 is repeated, except that the 100 parts of PES fibre are replaced by an intimate mixture of 50 parts of PES fibre and 50 parts of cotton or regenerated cellulose in yarn form, affording on the PES portion a deep blue dyeing with only slight staining of the cotton or regenerated cellulose fibre portion.

By aftertreating at 80° C. for 15 minutes with an aqueous liquor which contains a customary amount of sodium dithionite and sodium hydroxide solution, the cotton or regenerated cellulose fibre portion is completely decoloured.

EXAMPLE 6

Replacing the 100 parts of PES fibre of the polyethylene terephthalate type mentioned in Example 1 by a commercially available PES fibre of any other type gives a similarly good dyeing result.

EXAMPLE 7

Performing the dyeing on a PES fibre wound package (muff having a pack density of 300 g/l) in accordance with the directions of Example 1, in such a way that liquor circulation from in to out and a dyeing liquor throughput of 10 $.l.kg^{-1}.min^{-1}$ with a heating-up rate between 60° and 130° C. of 2°/min and a dyeing time at 130° C. of 15 min are used, gives a completely level dyeing.

What is claimed is:

1. Dyestuff mixture containing at least two separate dyestuffs (I) and (II) in a weight ratio of (I):(II) of from (20 to 99):(80:1) wherein:

(I) is at least one dyestuff of the formula

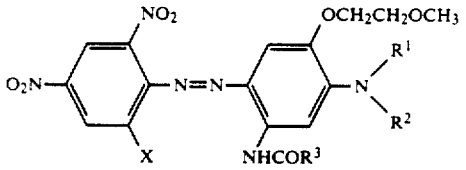

and (II) is at least one dyestuff of the formula

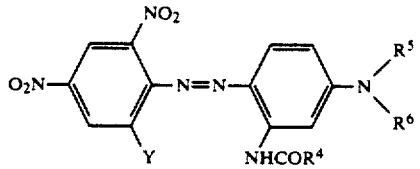

in which

X and Y are the same or different and each is independently chloro or bromo:

$R^1$ and $R^2$ are the same or different and each independently denotes hydrogen, alkoxy having 1 to 4 carbon atoms, alkenyl having 3 to 4 carbon atoms, cyclohexyl, benzyl, chlorobenzyl, bromobenzyl, nitrobenzyl, cyanobenzyl, alkylbenzyl having 1 to 4 carbon atoms in the alkyl moiety, alkoxybenzyl having 1 to 4 alkoxy carbon atoms, alkyl having 1 to 11 carbon atoms, alkyl having 1 to 11 carbon atoms interrupted by 1 to 3 oxygen atoms or substituted alkyl having 1 to 11 carbon atoms wherein the substituent is one selected from the group consisting of chloro, bromo, cyano, phenyl, phenoxy, hydroxy, ($C_1$-to-$C_4$-alkyl)-carbonyloxy; ($C_1$-to-$C_4$-alkoxy)carbonyl, phenylcarbonyloxy, ($C_3$-to-$C_5$-alkenyloxy)-carbonyloxy, ($C_1$-to-$C_4$-alkoxy)carbonyloxy, phenoxycarbonyloxy, tetrahydrofurfuryl, ($C_1$-to-$C_4$-alkyl)-tetrahydrofurfuryl, tetrahydropyronyl and ($C_1$-to-$C_4$-alkyl)-tetrahydropyronyl;

[$R^3$ and $R^4$ are the same or different and each is independently methyl, ethyl, n-propyl or i-propyl;]

*$R^3$ denotes ethyl, n- or i-propyl.*

*$R^4$ denotes methyl, ethyl, n- or i-propyl:*

$R^5$ and $R^6$ are the same or different and each is independently one of the definitions of $R^1$ and $R^2$ excepting hydrogen.

2. Dyestuff mixture according to claim 1 wherein:

$R^1$ is hydrogen or ethyl;

$R^2$ is hydrogen or ethyl;

$R^5$ and $R^6$ are the same or different alkyl having one to four carbon atoms.

3. Dyestuff mixture according to claim 1 wherein:

$R^1$ is hydrogen;

$R^2$ is hydrogen or ethyl;

$R^3$ is ethyl;

$R^4$ is methyl;

$R^5$ is ethyl;

$R^6$ is ethyl;

X is chloro; and

Y is bromo.

4. Dyestuff mixture according to claim 1 wherein the weight ratio of components (I):(II) is (80 to 99):(20 to 1).

5. Dyestuff mixture according to claim 4 wherein the ratio is (90 to 99):(10 to 1).

6. Dyestuff mixture according to claim 1 wherein:

(I) is the dyestuff of the formula

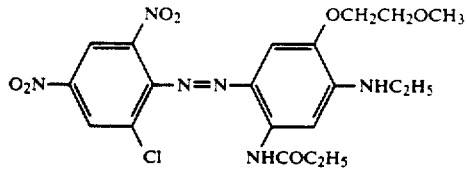

and (II) is the dyestuff of the formula

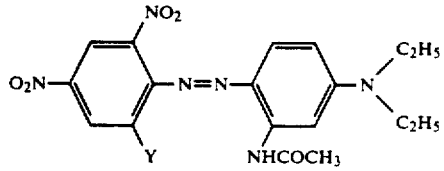

in a weight ratio of (I):(II) of from (90 to 99):(10 to 1).

7. Dyestuff mixture according to claim 1 which contains (Ia), (Ib) and (II) and wherein:

(Ia) is the dyestuff of the formula

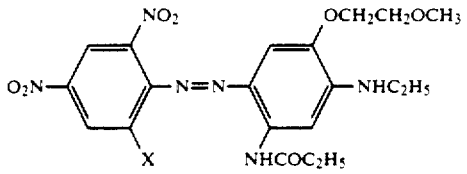

and (Ib) is the dyestuff of the formula

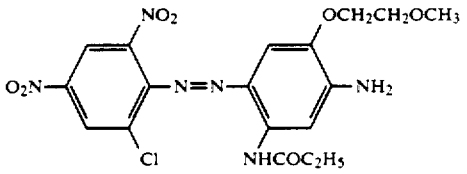

and (II) is the dyestuff of the formula

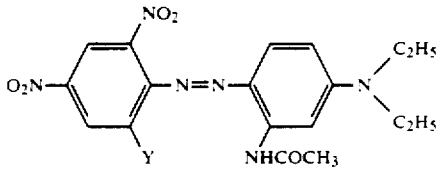

in a weight ratio of (Ia):(Ib):(II) of from (65 to 98):(15 to 30):(20 to 1) and the weight ratio of (Ia+Ib):II being (80 to 99):(20 to 1).

[8. Dyestuff mixture according to claim 1 wherein: (I) is the dyestuff of the formula]

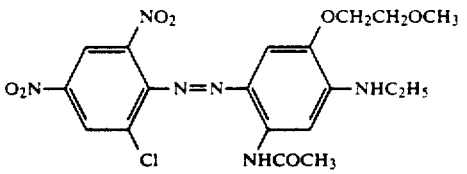

[and (II) is the dyestuff of for formula]

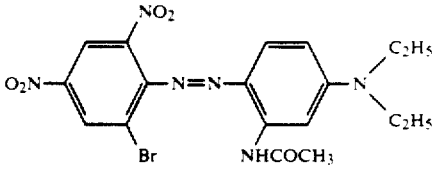

[in a weight ratio of (I):(II) of from (90 to 99):(10 to 1).]

9. Dyestuff mixture according to claim 1 which contains (Ia), (Ib) and (II) and wherein:

(Ia) is the dyestuff of the formula

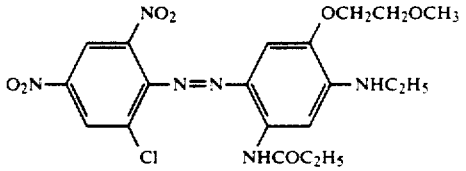

(Ib) is the dyestuff of the formula

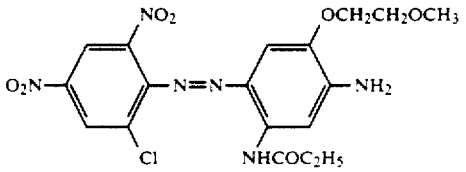

and (II) is the dyestuff of the formula

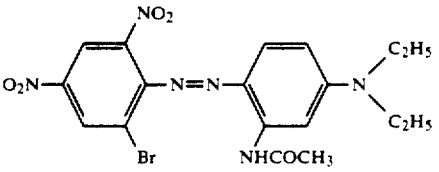

in a weight ratio of (I):(Ia):(II) of from (65 to 98):(15 to 20):(20 to 1) and the weight ratio of (Ia+Ib):II being (80 to 99):(20 to 1).

10. The process for preparing a dyestuff mixture according to claim 1 wherein individual dyes of components I and II are mixed with one another.

11. The process for preparing a dyestuff mixture according to claim 1 wherein the precursor diazo components and coupling components of dyestuffs I and II are mixed with one another.

* * * * *